May 15, 1923.   1,455,570
P. CASSARA
MOTOR AND STEERING CONTROL FOR AUTOMOBILES
Filed Oct. 11, 1922   2 Sheets-Sheet 1

Inventor
Pasquale Cassara,
By
Attorney

May 15, 1923.  1,455,570
P. CASSARA
MOTOR AND STEERING CONTROL FOR AUTOMOBILES
Filed Oct. 11, 1922 2 Sheets-Sheet 2
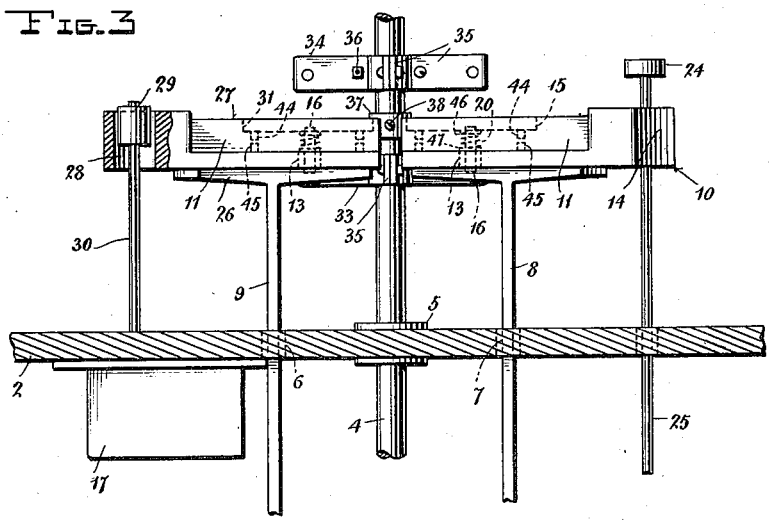
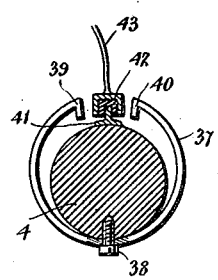
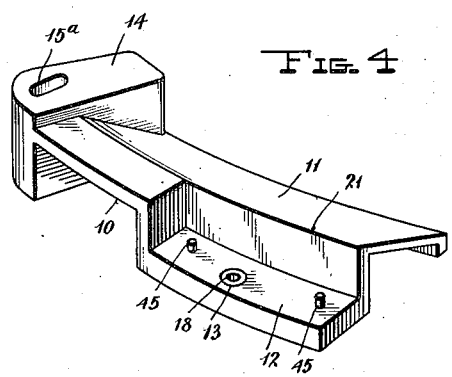
Inventor
Pasquale Cassara,
By
Attorney Patented May 15, 1923.

1,455,570

UNITED STATES PATENT OFFICE.

PASQUALE CASSARA, OF BETHLEHEM, PENNSYLVANIA.

MOTOR AND STEERING CONTROL FOR AUTOMOBILES.

Application filed October 11, 1922. Serial No. 593,790.

*To all whom it may concern:*

Be it known that I, PASQUALE CASSARA, a citizen of the United States, residing at Bethlehem, in the county of Northampton and State of Pennsylvania, have invented new and useful Improvements in Motors and Steering Controls for Automobiles, of which the following is a specification.

This invention relates to steering and motor control means for automobiles and proposes a construction in which the steering, starting, accelerating, clutch, brake, and horn-circuit closing means, and any other control means which are now used, or may be used in the operation of a motor vehicle, are so combined, by convenience of arrangement, as to be individually operable or collectively operable in desired groups, by a single foot of the operator.

While the invention primarily contemplates the provision of means whereby perfect control of an automobile may be enjoyed by one who is physically disabled in both arms and one leg, it is not limited in its use to those so handicapped, but on the contrary, the simplicity of construction and arrangement which places the full control of the auto-vehicle under the dominion of a single foot, qualifies my invention as a simple, safe, and convenient improvement over the ordinary plural foot and hand controls, for all who drive.

One of the objects of the invention is to provide the steering rod of the automobile with foot operated pedals arranged adjacent the motor control pedals within reach of the foot of the operator without necessity of removing the foot from operative relation with the motor controls.

Another object of the invention is to closely associate the foot pedals on the steering rod with the horn-circuit closing means, so that the automobile may be steered and the horn sounded, simultaneously by the action of one foot.

Another object of the invention is the arrangement of the several motor control pedals in arcuate form around the circumference of a circle described by the foot of the operator when moved about a central point beneath the heel thereof.

Still another object of the invention is the provision of a heel plate having an arcuate depression within which the heel of the operator's foot may turn, and a series of motor controls arranged arcuately within operative reach of the foot without shifting the latter laterally away from the heel plate.

A further object of the invention is the provision of clutch and horn-circuit closing means, or brake and horn-circuit closing means, or both, so closely positioned as to be simultaneously operable, if desired, by the pressure of one foot.

A still further feature of the invention is the novel construction of control elements, by which I am enabled to carry out the above objects.

With the above and other objects in view, my invention consists in the improved motor and steering control for automobiles illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 3 is a front elevation, partly in section taken along the line 3—3 of Figure 1.

Figure 4 is a perspective view of the integral casing forming the top of the brake pedal.

Figure 5 is a cross section taken along the line 5—5 of Figure 1.

Figure 1:
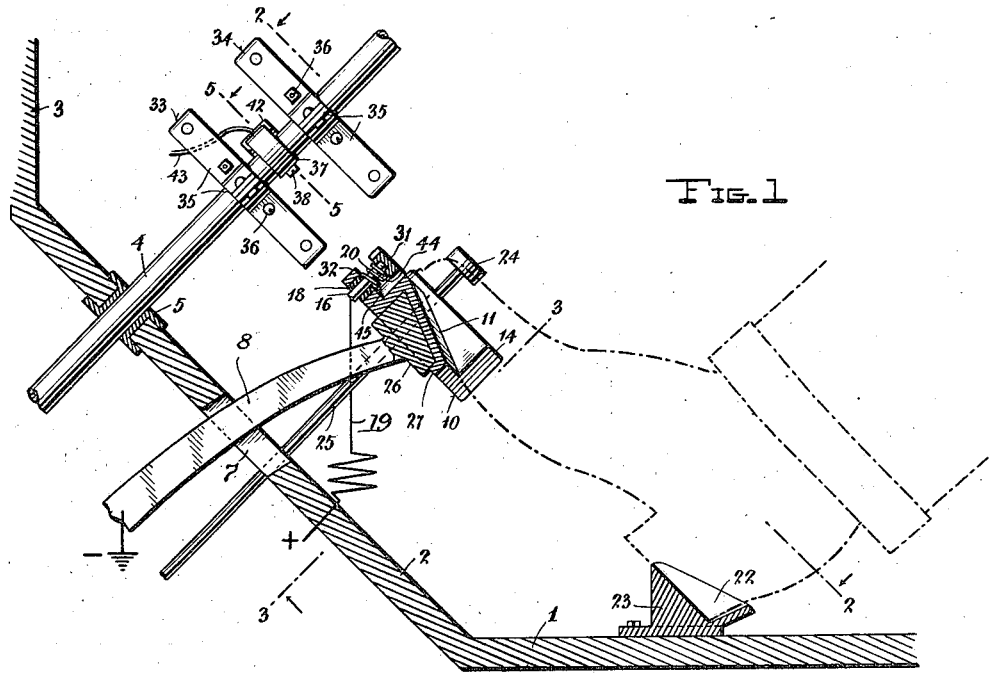
Figure 1 is a side sectional view of a portion of the floor of an automobile showing my invention installed.
Figure 2:
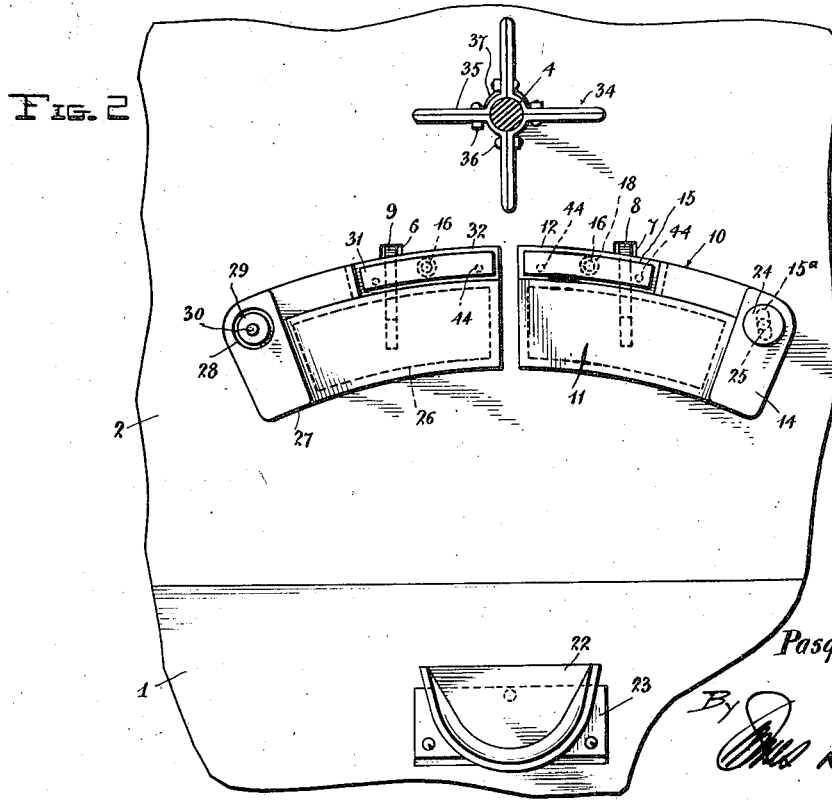
Figure 2 is a plan view taken along the line 2—2 of Figure 1.

Referring now in detail to the several figures the numeral 1 represents the front part of the horizontal portion of the floor of an automobile, to which is joined the upwardly inclined portion 2, the latter extending to the dash-board 3. The steering rod 4, which is of the type not enclosed by a stationary casing, passes through the inclined portion of the floor, being journalled in a metallic thimble 5. Slots 6 and 7 are formed in the inclined portion of the floor through which pass the shanks 8 and 9 respectively of the brake and clutch pedals.

According to my invention, the brake pedal 8 is shod with a casing 10, shown in detail in Figure 4, said casing being arcuate in form at its front and back edges and provided with an inclined foot-engaging portion 11 which is normally pressed by the foot when it is desired to operate the brake. The casting 10 is further provided with a depressed portion 12 having a circular aperture 13 extending therethrough and bushed with a tube of insulation material 18. At its outer end said casting is formed with an elevated portion 14 provided with an elongated slot 15ª extending through said elevated portion from the top to bottom. The depressed portion 12 forms a recess in which is located the flat elongated T-shaped horn circuit control pedal 15, which is shown in cross section in Figure 1 and in broken lines in Figure 3. This control pedal 15 has a stem 16 which passes through the bushing 18 by means of which it is electrically insulated from the brake pedal, the latter being connected to one pole of a source of current. The horn pedal 15 is electrically connected to the other side of the source of current by the flexible insulated cable 19, the circuit being closed, by the pressure of the foot, from the horn pedal, through contacts 44 depending from the horn pedal, and the upstanding contacts 45 which are preferably made integral with the casting 10.

The depth of the depressed portion 12 is sufficient to include the entire range of movement of the pedal 15, the latter being normally maintained in its top position by means of the spring 20, shown in Figure 3, which surrounds the stem 16 of the horn pedal and abuts at its ends against the insulation washers 46 and 47.

It will be noted from Figure 1 that when the foot of the operator is against the face 11 of the brake pedal the latter may be depressed without necessarily depressing the horn-circuit closing pedal 15, that by shifting the foot forwardly a slight distance both the brake and horn-circuit closing pedals may be simultaneously depressed and that by tilting the foot when in slightly advanced position along the forward edge 21 of the brake pedal the horn-circuit closing pedal 15 may be operated without depressing the brake pedal.

The accelerator pedal 24 is normally carried in a raised position above the elevated portion 14 of the brake pedal by means of a stem 25 which passes through the elongated slot 15ª, through an aperture in the floor of the automobile where it is connected with mechanism not shown for operating the throttle valve of the carbureter. The accelerator pedal is reached by rotating the heel within the well 22 of the heel plate to bring the ball of the foot over the pedal 24 and the pedal 24 may be actuated independently of the operation of the brake pedal. The provision of the elongated slot 15ª affords lost motion whereby the brake pedal may describe the slight arcuate movement incident to the shape of its shank without conflicting with the reciprocatory movement of the accelerator pedals.

The clutch pedal is, as usual, located adjacent to the brake pedal, and attached to the stem 9 is the clutch pedal 26, which is shod with a casting 27 similar in all respects to the casting 10 shown in Figure 4 except that the narrow slot 15ª of the casting 10 is, in the casting 27, replaced by a wide slot 28 for the reception of the starter button 29. This button projects a sufficient distance above the surface of the clutch pedal to be operable independently of the clutch pedal and is attached to the stem 30 which extends into the switch box 17 and effects the closure of the starting switch, not shown. A horn-circuit closing pedal 31, which is similar to the horn-circuit closing pedal 15 is operable through a range of movement within the depressed portion 32 of the clutch pedal and bears precisely the same relation to the clutch pedal in both its structural association and operation as does the horn-circuit closing pedal to the brake pedal 8. The clutch pedal, horn-circuit closing pedal 31 and starter button 29 may be actuated by the same foot which actuates the brake pedals, horn-circuit closing pedal 15 and accelerator pedal by merely turning the foot, within the heel plate 23. By placing the foot in the mid-position both the clutch and brake pedals may be simultaneously depressed, and by advancing the foot forwardly a slight distance while in this position, the horn may be sounded at the same time. During any of these operations the foot normally rests in the concave well 22 of the heel plate 23, the heel being shifted slightly within said heel plate or raised therefrom but never shifted laterally so as to be separated from association with said heel plate.

The steering rod 4 is provided with a pair of steering spiders 33 and 34, each of which consists of four arms 35 arranged 90° apart and preferably built up of separate parts bolted together as shown at 36 so as to embrace the steering rod in clamping relation. The upper spider 34 is arranged substantially in the plane of movement of the foot when the latter is in the upper position of the motor controls and the lower spider 33 is positioned to be conveniently accessible to the foot when either the brake or clutch pedal is depressed. Between the spiders 33 and 34 is located a third horn-circuit closing switch 37, which consists of a split ring secured to the steering rod 4 at a point diametrically opposite its split portion by means of the screw 38 and by which means said split ring is grounded electrically to the mass of the automobile. A stationary contact carrying member 41 is arranged between the separated ends 39 and 40 of the split ring, and carries an insulated contact piece 42 which is suitably connected by means of the insulated wire 43 with one pole of the horn-circuit. The steering rod is turned, for steering the automobile, by pressure of the foot of the operator against one of the spider arms 35. If, while steering, it becomes necessary to sound the horn, this is accomplished by sidewise pressure of the foot against one or the other of the sides of the split ring 37, simultaneously with the act of steering.

While, in its preferred embodiment I have shown the invention operated solely by the pressure of a single foot it is obvious that both feet could be used one resting normally upon the brake pedal and the other upon the clutch pedal, and one or both feet being used in the operation of steering. It is not contemplated that the usual hand wheel at the end of the steering rod, but not shown in the drawing, should be dispensed with, but that said hand wheel should be normally used for steering, the spiders 33 and 34 being in the nature of an accessory device for emergency use except in cases where the operator is physically unable to make use of the hand steering wheel.

While I have above described what I have found to be a very practical embodiment of my invention, it is nevertheless to be understood that the motor and steering control for automobiles may also be exemplified in numerous other alternative constructions and I accordingly reserve the right of adopting all such legitimate changes as may be fairly embodied within the spirit and scope of the invention as claimed.

Having described my invention what I claim as new and desire to secure by Letters Patent, is:—

1. Control mechanism for auto-vehicles comprising a rotatable steering rod, foot operated motor controls arranged adjacent said steering rod having positions of elevation and depression and means engageable by the foot for turning said steering rod located adjacent the positions of elevation and depression of said motor controls.

2. Control mechanism for auto-vehicles comprising a rotatable steering rod, foot operated motor controls arranged adjacent said steering rod having positions of elevation and depression and a pair of spiders engageable by the foot for turning said steering rod and located respectively adjacent the positions of elevation and depression of said motor controls.

3. Control mechanism for auto-vehicles comprising a rotatable steering rod, foot operated motor controls arranged adjacent said steering rod having positions of elevation and depression and a pair of spiders engageable by the foot for turning said steering rod and located respectively adjacent the positions of elevation and depression of said motor controls and a horn-circuit closing switch secured to said steering rod between said spiders.

4. Control mechanism for auto-vehicles comprising a rotatable steering rod, foot operated motor controls arranged adjacent said steering rod and having positions of elevation and depression, upper and lower foot engageable means secured to said steering rod, each comprising a pair of arms extending from the opposite sides of said steering rod, said means lying respectively adjacent the motor controls in their elevated and depressed position and a horn-circuit closing switch secured to said steering rod and engageable by pressure of the foot from either side of said steering rod.

5. Motor control mechanism for auto-vehicles, comprising a plurality of control pedals arranged arcuately in the path of movement of the foot of an operator about a pivotal point.

6. Motor control means for auto-vehicles comprising a heel plate and a plurality of pedal controls arranged arcuately in the path of movement of the foot of the operator about a pivotal point in said heel plate.

7. A motor control for auto-vehicles comprising a plurality of pedals arranged arcuately in the path of movement of the foot of an operator about a pivotal point, a plurality of other pedals normally arranged at a higher level than the first named pedals and in superposed relation thereto.

8. A motor control for auto-vehicles comprising a plurality of pedals arranged arcuately in the path of movement of the foot of an operator about a pivotal point, a plurality of other pedals normally arranged at a higher level than the first named pedals and passing through apertures in said first named pedals.

9. Motor control means for auto-vehicles comprising a heel plate, a group of pedals arranged arcuately in the path of rotation of the foot of an operator around a pivotal point in said heel plate, and a second group of pedals normally lying at a higher level than the first group, and passing through apertures in the pedals of the first group.

10. Motor control means for auto-vehicles comprising a pair of pedals arcuately arranged in the path of rotary movement of the foot of an operator about a pivotal point, a second pair of pedals arranged in superposed relation to said first pair and passing through apertures in said first pair of pedals, the pedals of one pair being selectively operable with or independently of the pedals of the second pair.

11. Motor control means for auto-vehicles comprising a pair of pedals arcuately arranged in the path of rotary movement of the foot of an operator about a pivotal point, a second pair of pedals arranged in superposed relation to said first pair and passing through apertures in said first pair of pedals, the pedals of either pair being selectively operable simultaneously with or independently of the pedals of the other pair, and a third pair of pedals arranged through apertures in the first pair and operable independently thereof.

12. Motor control means for auto-vehicles comprising a pedal, a casting constituting the top of said pedal having a foot engaging surface and also having a depressed portion at one end and an elevated portion at the other, said casting also having slots extending through said depressed and elevated portions, and independently operable pedals having portions extending through said slots, one of said pedals having a range of movement within the depressed portion of said casting.

13. Motor control means for auto-vehicles comprising a pair of pedals, a casting forming the top of each pedal, said casting being arranged arcuately in the path of rotary movement of the foot of an operator about a pivotal point, said castings each being formed with a foot engaging surface and having a depressed portion adjacent the inner end thereof and an elevated portion at the outer end, said castings also having slots formed in the walls of said depressed and elevated portions, horn-circuit control pedals located within said depressed portions and being provided with stems passing through the slots in said portions, said pedals having a range of movement within said depressed portions, a starter pedal working through the slot in one of said elevated portions and an accelerator pedal working through the slot in the other elevated portion.

In testimony whereof I affix my signature.

PASQUALE CASSARA.